United States Patent Office 2,732,549
Patented Jan. 24, 1956

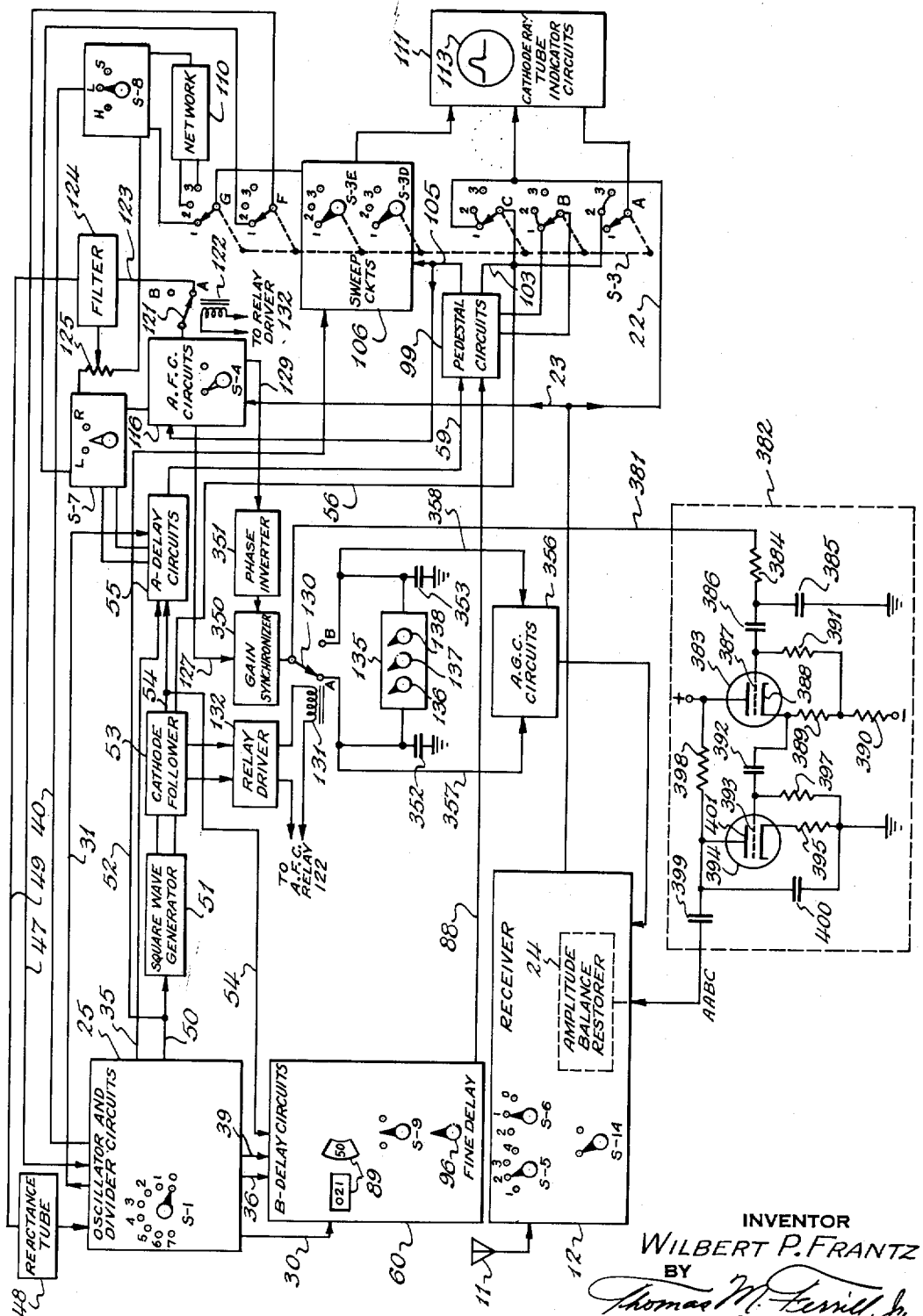

2,732,549

AUTOMATIC AMPLITUDE BALANCE CONTROL SYSTEM FOR HYPERBOLIC NAVIGATION RECEIVER

Wilbert P. Frantz, Long Beach, N. Y., assignor to Sperry Rand Corporation, a corporation of Delaware Application January 13, 1954, Serial No. 403,771

7 Claims. (Cl. 343—103)

The present invention relates to automatic amplitude balancing circuits, and especially to simplified automatic amplitude balancing circuits usable in loran receiver-indicators.

In my Patent 2,651,033 I have taught an automatic amplitude balance control (AABC) system for a loran receiver-indicator in which the gain of the receiver is automatically and sequentially varied according to the amplitudes of received master and slave pulse voltage waves in order to maintain the amplitudes of the output master and slave pulse voltages equal in value. This AABC system operates in conjunction with an AGC system to maintain the received output master and slave pulses at a suitably predetermined constant value.

Briefly, my prior AABC system is responsive to received output loran A and B pulses, and switches the received A pulses into a first channel and the received B pulses into a second channel. A first direct potential is produced in the first channel which varies according to the peak value of the received A pulses, and a second direct potential is produced in the second channel which varies according to the peak value of the received B pulses. The first and second direct potentials are supplied to a balanced modulator to which is also supplied a reference square-wave voltage synchronized with the received loran A and B pulses. The balanced modulator produces a square-wave output voltage whose phase is determined by the relative values of the first and second direct potentials, and whose amplitude is determined by the difference in value between the first and second direct potentials. This square-wave AABC output voltage is supplied to the loran receiver-indicator for automatically and sequentially varying the gain of the receiver to maintain the received output A and B pulses equal in value.

The present invention discloses a simplified alternative AABC system which may be used in the prior art loran receiver-indicators, and this alternative system varies the gain of the receiver automatically and sequentially in the same general manner as is taught in my aforesaid patent. The present invention distinguishes over the AABC system of the aforesaid patent in that a simplified circuit arrangement has been made possible as a result of the discovery of a new method by which an automatic amplitude balance control voltage may be produced. This simplified circuit arrangement eliminates the need for switching the received A and B pulses into separate channels, producing first and second direct potentials in these channels, and supplying the respective direct potentials together with a square-wave reference voltage to a balanced modulator to produce the AABC voltage.

Accordingly, a principal object of the present invention is to provide a simplified automatic amplitude balance control system for loran receiver-indicators.

Another object is to provide an automatic amplitude balance control system for loran receiver-indicators in which the need for direct-coupled amplifier circuits and the accompanying difficulties associated therewith is eliminated.

In accordance with the present invention there is introduced a system for producing an automatic amplitude balance control voltage for a loran receiver-indicator including a relay having a movable contact alternating between a first position during reception of the loran A pulse and a second position during reception of the loran B pulse. Received loran A and B pulses are detected and supplied to the movable contact where the received A pulses are coupled through the first relay position to a first condenser, and the received B pulses are coupled through the second relay position to a second condenser. The first condenser is charged to a first direct potential according to the peak value of the A pulse and the second condenser is charged to a second direct potential according to the peak value of the B pulse. An output voltage alternating between the first direct potential value across the first condenser and the second direct potential value across the second condenser is obtained from the movable contact of the relay. This alternating voltage is the AABC voltage, and is supplied to the gain controlling circuit of the loran receiver for varying the gain of the receiver such that the gain during reception of the stronger loran pulse is less than the gain during the reception of the weaker loran pulse. As a result, the received output A and B pulses are maintained substantially equal in value.

The above objects of and the brief introduction to the present invention will be more fully understood, and further objects and advantages will become apparent from a careful study of the following detailed description in connection with the drawings, wherein the single figure illustrates a combination block and schematic diagram of a loran receiver-indicator employing the simplified automatic amplitude balance control system of the present invention.

Those elements in the accompanying drawing fully corresponding to those in my aforesaid Patent 2,651,033 are identified by the same reference numerals as employed therein.

Referring to the single figure, loran A and B pulses of carrier-wave energy from remote master and slave stations are collected by antenna 11 and supplied to the input of superheterodyne receiver 12. Receiver 12 is identical to the receiver shown and described in my aforesaid Patent 2,651,033. The received A and B pulses are amplified, detected, and supplied as positive A and B pulses over lead 22 to the cathode-ray tube indicator circuits 111, and over lead 23 to an input of the AFC circuits 116. The automatic amplitude balance control voltage from the AABC circuits of the present invention is supplied to the amplitude balance restorer 24 in receiver 12 as will be explained more fully hereinafter. An automatic gain control voltage also is supplied to receiver 12 as will be explained hereinafter.

The precision timing circuits of the loran receiver-indicator comprise the oscillator and divider circuits 25, the square-wave generator 51, the A delay circuits 55, and the B delay circuits 60. These circuits are similar to those described and claimed in application S. N. 633,473, filed December 7, 1945, in the name of Winslow Palmer, entitled "Timing Apparatus" and assigned to the same assignee of the present invention. They are identical with those shown and described in the aforesaid patent, and, therefore, will be described only briefly in the present specification.

Oscillator and divider circuits

The conventional oscillator and divider circuits of block 25 comprise a crystal-controlled oscillator operating at a frequency of 100 kilocycles-per-second, and a cascade of five frequency dividers, dividing the frequency of the oscillator output voltage in the steps of 5, 4, 5, 5, and 4 respectively, followed by a transient delay circuit. These frequency divider circuits supply the basic timing voltages for the loran receiver-indicator. The output voltage from the first frequency divider is supplied over lead 30 to one input of the B delay circuits 60, and over lead 31 to one of the inputs of the A delay circuits 55. The output voltage of the third frequency divider is supplied over lead 35 to another input of the A delay circuits 55, and over the lead 36 to a second input of the B delay circuits. The output voltage from the fourth frequency divider is supplied over lead 39 to a third input of the B delay circuits. The output voltage from the transient delay circuit is coupled over lead 50 to the input of the square-wave generator 51, and over lead 52 to the sweep circuits 106.

The basic pulse repetition rates used in loran are 33⅓, 25, and 20 cycles per second, and are identified by the letters H, L, and S. These pulse repetition rates are provided in the oscillator-divider circuits 25 by the basic PRR switch S–8 coupled over lead 40 to the fifth frequency divider of the oscillator-divider circuits. This switch S–8 controls the frequency division of the fifth frequency divider to provide a division of 3 for the rate H, 4 for the rate L, and 5 for the rate S. In addition to the three basic pulse repetition rates H, L, and S, seven additional specific pulse repetition rates identified as 0 through 7 are employed in loran. The specific PRR switch S–1 controls the feedback of pulses from the output of the fifth frequency divider to the inputs of the second and third frequency dividers to provide these specific rates in the oscillator-divider circuits 25.

A reactance tube circuit 48 is coupled to the 100 kilocycle-per-second crystal oscillator, and corrects the frequency of this oscillator in response to an automatic frequency control voltage supplied over lead 49 from the AFC circuits 116. A description of these AFC circuits will appear hereinafter.

*Square-wave circuits*

The positive output pulse voltage on lead 50 from the oscillator and divider circuits is differentiated at the two inputs of an Eccles-Jordan circuit used as a square-wave generator 51 to produce a square-wave output voltage whose frequency is equal to one-half the repetition frequency of the differentiated triggering pulses. The frequency of this square-wave voltage corresponds to the pulse repetition frequency of the loran signals. The mark and space time intervals of the square-wave voltage are each equal to 20,000 microseconds for the selected loran pulse repetition rate LO. The square-wave output voltage from generator 51 is supplied to a push-pull cathode follower 53.

Cathode follower 53 produces two square-wave output voltages, one inverted in phase with respect to the other, and one of these square-wave voltages is supplied over lead 54 to the input of the A delay circuits 55 and to the B delay circuits 60. The other square-wave voltage is supplied over lead 56 to the arm of operations switch S–3C. Both of the square-wave voltages are supplied to the relay driver 132. The negative half-cycle of the square-wave voltage on lead 54 energizes the A delay circuits 55, and this voltage is subsequently synchronized with respect to the received loran signals so as to correspond with the time interval during which the A pulses from the master station arrive at the receiver 12. The positive half-cycle of the square-wave voltage on lead 54 energizes the B delay circuits 60, and corresponds to the time interval during which the B pulses from the slave station will arrive at the receiver.

*A delay circuits*

The A delay circuits 55 comprise a pedestal delay circuit and a pedestal synchronizer, as is more fully described in my aforesaid patent. The square-wave voltage on lead 54 is differentiated to produce negative trigger pulses coincident with the trailing or "negative going" edges of the square-wave voltage, and these negative trigger pulses initiate the pedestal delay circuit. The voltage on lead 35 from the third frequency divider is also differentiated and applied to the pedestal delay circuit to terminate the pedestal delay circuit by the first of the trigger pulses to arrive following the initiation of the pedestal delay circuit. The output from the pedestal delay circuit is a series of positive pulses of one-thousand microseconds duration and whose recurrence interval equals the recurrence interval of the square-wave voltage on lead 54.

Both positive and negative output pulses from the pedestal delay circuit are applied to the "left-right" switch S–7. The positive pulses are coupled through the "left" position of switch S–7 and through position 1 of switch S–3F to the input of the third frequency divider over the lead 47 to delay the triggering of the third frequency divider by one more of its 200 microsecond input pulses. This causes an increase in the recurrence interval of the output pulses from the fifth divider which results in an increase in the recurrence interval of the sweep voltage applied to the cathode-ray tube indicator circuits 111. This increase in sweep recurrence interval causes the received loran pulses to drift slowly across the face of the cathode-ray tube toward the left. Conversely, the negative pulses from the pedestal delay circuit are coupled to the "right" position of switch S–7 and through position 1 of switch S–3F and over lead 47 to the input of the third frequency divider in order to pretrigger this divider by one less of its 200 microsecond input pulses. This reduction in recurrence interval results in a shorter sweep recurrence interval thereby causing the received loran pulses delineated upon the face of the cathode-ray tube to drift slowly across the face of the tube toward the right. When the "left-right" switch S–7 is in its neutral position, there is no feedback of pulses and consequently there is very little if any drift of the delineated loran pulses.

The pedestal synchronizer is triggered by negative pulses derived from and coincident with the trailing edges of the positive output pulses from the pedestal delay circuit. The pedestal synchronizer is terminated by the first of the fifty microsecond negative trigger pulses on lead 31 to arrive following the initiation of the pedestal synchronizer. The output from the pedestal synchronizer is a series of positive pulses of approximately fifty microseconds duration and whose recurrence interval equals the recurrence interval of the square-wave voltage on lead 54. The trailing edges of these output pulses are delayed approximately one-thousand and fifty microseconds from the trailing edges of the square-wave voltage on lead 54, and the timing of the trailing edges of these output pulses is under the accurate control of the pulses on lead 31 from the first frequency divider. These recurrent output pulses are coupled over lead 59 to the input of pedestal circuits 99.

*B delay circuits*

The B delay circuits 60 are similar to those shown and described in the aforesaid application S. N. 633,473, and are identical to those shown and described in my aforesaid Patent 2,651,033. The function of the B delay circuits 60 is to produce recurrent variably delayed output pulses whose recurrence interval is equal to the recurrence interval of the square-wave voltage on lead 54, and whose time delay with respect to the recurrent output pulses from the A delay circuits 55 is adjustable by accurately known amounts indicated on a time difference counter 89. This time delay difference is established with an absolute accuracy better than 1 microsecond. The recurrent variably delayed output pulses from B delay circuits 60 occur during the time interval that the half-cycle of the square-wave voltage on lead 54 is positive. The recurrent output pulses from the A delay circuits occur during the time interval that the half-cycle of the square-wave voltage on lead 54 is negative. Therefore, a fixed time delay exactly equal to one-half the recurrence interval of the square-wave voltage on lead 54 exists between the recurrent pulses from the B delay circuits 60 and the recurrent pulses from the A delay circuits 55 in addition to the variable time delay introduced by the B delay circuits.

The recurrent variably delayed output pulses on lead 88 from the B delay circuits 60 are approximately 30 microseconds in duration, and are variable in time relative to the leading edges of the square-wave voltage on lead 54 smoothly and unambiguously over the range of from 1,050 to almost 20,000 microseconds. Moreover, the trailing edges of these variably delayed pulses vary in time relative to the trailing edges of the output pulses from the A delay circuits 55 on lead 59 smoothly and continuously over the range of exactly 0 to almost 20,000 microseconds plus exactly one-half the recurrence time interval of the received loran A and B pulses under the control of the course delay switch S–9 and the fine delay control knob 96.

Pedestal circuits

The pedestal circuits 99 comprise a pulse mixer and a pedestal generator. Negative trigger pulses derived by differentiating the trailing edges of the positive recurrent output pulses on lead 59 are combined with negative trigger pulses derived by differentiating the trailing edges of the positive recurrent output pulses on lead 88 in the pulse mixer. Each of these negative trigger pulses initiate the pedestal generator, a monostable multivibrator, which is terminated automatically by its own action. The pedestal generator provides a separate positive and a negative pulse output voltage. These pedestal pulses are of approximately 1,300 microseconds duration for positions 1 and 2 of operation switch S–3B, and are approximately 175 microseconds duration for position 3 of S–3B. The positive pedestal output pulses are supplied over lead 103 to the arm of operations switch S–3C, and also to terminals 2 and 3 of switch S–3A. The pedestal pulses initiated by the pulse voltage on lead 59 produce the A pedestal, and the variably delayed pedestal pulses initiated by the pulse voltage on lead 88 produce the B pedestal. The square-wave voltage from the cathode follower 53 appearing on lead 56 is combined with the positive pedestal pulses on lead 103. The negative pedestal pulses are supplied over lead 105 to terminals 2 and 3 of operations switch S–3E, and also to one input of the AFC circuits 116.

Sweep circuits

The sweep circuits 106 include a gate generator, a sweep generator for producing a slow, medium, or fast sweep-speed voltage, and a sweep restorer. Trigger pulses produced from the trailing edges of the recurrent output voltage from the oscillator-divider circuits 25 on lead 52 initiate the sweep generator to produce the slow sweep-speed voltage. When the switch S–3E is in position 1, this slow sweep-speed voltage is supplied to one input of the cathode-ray tube indicator circuits 111. The medium and fast sweep-speed voltages are produced when the operations switch S–3E is in the positions 2 and 3, respectively, and these sweep voltages are initiated by the recurrent negative pedestal pulses supplied over lead 105. The sweep generator produces a linear, medium sweep-speed voltage coincident with and for the duration of the recurrent negative pedestal pulses when switch S–3E is set to position 2. Similarly, the fast sweep-speed voltage is coincident with and extends for the duration of the recurrent negative pedestal pulses when the operation switch S–3 is set to position 3.

Network 110 coupling basic PRR switch S–8 with switch S–3G serves to maintain the amplitudes of the three sweep-speed voltages of constant value for the three basic pulse repetition rates H, L, or S. The sweep restorer included within the sweep circuits 106 clamps the lower edges of the three sweep-speed voltages to a reference voltage level to insure that the cathode-ray trace on the face of the cathode-ray tube starts from the same point on the face for each of the three sweep voltages.

Cathode-ray tube indicator circuits

The cathode-ray tube indicator circuits 111 include a cathode-ray tube, a horizontal sweep amplifier, a vertical amplifier, and an intensity restorer. The sweep voltages from the sweep circuits 106 are amplified in the horizontal sweep amplifier and applied to the horizontal deflection plates of the cathode-ray tube 113. The vertical amplifier amplifies the composite voltage consisting of the pedestal pulses on lead 103, the square-wave voltage on lead 56, and the received loran A and B pulses on lead 22, and supplies these voltages to the vertical deflection plates of the cathode-ray tube 113. The pedestal pulses on lead 103 are supplied through positions 2 and 3 of switch S–3A to the input of the intensity restorer. The restorer clamps the upper edges of these positive pedestal pulses to a fixed voltage level corresponding to normal intensity of the cathode-ray trace on the face of the cathode-ray tube, and the negative portions of these pedestal pulses, corresponding to the time intervals between sweeps, bias the control-grid of the cathode-ray tube so as to blank the cathode-ray beam.

Automatic frequency control circuits

The automatic frequency control circuits 116 are similar to those described and claimed in Patent 2,636,988 and are identical with those as shown and described in my aforesaid Patent 2,651,033. The AFC circuits 116 include an AFC delay circuit, an AFC amplifier, and an AFC synchronizer. Negative trigger pulses derived from the leading edges of the negative A and B pedestal pulses on lead 105 initiate the AFC delay circuit. This circuit produces negative output pulses of approximately 100 microseconds duration, and these negative pulses are applied to a differentiating circuit at one input of the AFC synchronizer, and to the gain synchronizer 350 over lead 127.

The differentiating circuit at one input of the AFC synchronizer produces first and second positive output trigger or sampling pulses from the trailing edges of the negative 100 microsecond pulses. The first positive sampling pulses are delayed 100 microseconds from the leading edges of the negative A pedestal pulses on lead 105, and the second positive sampling pulses are delayed 100 microseconds from the leading edges of the negative B pedestal pulses on lead 105.

Received A and B pulses from receiver 12 are supplied over lead 23 to the AFC amplifier where they are further amplified and supplied to a differentiating circuit at another input of the AFC synchronizer. AFC switch S–4 coupled to the AFC amplifier places the AFC circuits 116 in operation. The output of the AFC amplifier is grounded by the "left-right" switch S–7 to disable the operation of the AFC during the "left" or "right" positions to allow for proper operations of the drift circuits.

The AFC synchronizer produces first and second recurrent output pulses of current. The amplitude of the first pulses varies according to the relative time position or coincidence between the applied differentiated A pulses and the applied first positive sampling pulses from the differentiating circuit at the input of the AFC synchronizer. The amplitude of the second pulses of current varies according to the relative time position or coincidence between the applied differentiated B pulses and the second positive sampling pulses from the differentiating circuit. These first and second output pulses of current are applied to the armature 121 of relay 122. The relay is energized by the square-wave voltage from the relay driver 132 to separate the first output pulses of current from the AFC synchronizer from the second output pulses of current. The first output pulses, varying according to the relative time position of the differentiated A pulses with respect to the applied first positive sampling pulses, are applied over lead 123 to a long time constant filter 124 where they are integrated to produce the automatic frequency control voltage. This AFC voltage biases reactance tube 48 so as to maintain the frequency of the 100 kilocycle-per-second oscillator in the oscillator divider circuits 25 such that the first positive sampling pulses applied to the AFC synchronizer are coincident with the differentiated A pulses.

The magnitude of the control voltage on lead 49 is under the independent manual control of the drift potentiometer 125 and the "left-right" switch S-7 coupled to the filter 124. The "left-right" switch S-7 provides two fixed negative control voltages of different magnitudes for biasing reactance tube 48, in addition to supplying feedback pulses to the third frequency divider through switch S-3F as explained heretofore in connection with the A delay circuits 55. In the "left" position of switch S-7, one of these negative control voltages causes the delineated pulses on the face of the cathode-ray tube 113 to drift slowly across the face of the tube to the left, while in the "right" position of switch S-7 the other negative control voltage causes a drift of the delineated loran pulses to the right. The drift potentiometer 125 provides an adjustable negative control voltage from filter 124 for slowly drifting the delineated A and B pulses either to the right or to the left. These manual controls facilitate the alignment of the received loran A and B pulses atop their respective A and B pedestals. The basic PRR switch S-8 coupled to filter 124 through potentiometer 125 provides three separate time constants for the filter corresponding to the three basic pulse repetition rates H, L, or S.

*Automatic gain control circuits*

The automatic gain control circuits now to be described are distinct from those described in my aforesaid Patent 2,651,033, and these circuits are more fully described and claimed in my application S. N. 403,852, filed concurrently herewith, entitled "Automatic Gain Control System for Hyperbolic Navigation Receivers," and assigned to the same assignee as the present invention. Recurrent negative 100 microsecond pulses are supplied from the AFC circuits 116 over lead 127 to a differentiating circuit at one input of a gain synchronizer 350. The differentiating circuit produces first and second positive sampling pulses from the trailing edges of these recurrent negative 100 microsecond pulses in the same manner as described in connection with the AFC circuits 116. These first and second positive sampling pulses may be amplified before energizing the gain synchronizer 350. Negative loran A and B pulses are supplied from the AFC circuits 116 over lead 129 to a phase inverter 351. Positive loran A and B pulses from the output of the phase inverter 351 are supplied to another input of gain synchronizer 350. The gain synchronizer may be of the four-diode switch type as shown in Fig. 10.10 on page 374 of the book "Waveforms" published by the McGraw-Hill Book Company, 1949.

The gain synchronizer produces first recurrent output pulses of current whose amplitude varies according to the relative time position or coincidence between the first positive sampling pulses and the loran A pulses, and produces second recurrent output pulses of current whose amplitude varies according to the relative time position between the second positive sampling pulses and the loran B pulses. Since the first positive sampling pulses have been made to occur coincident with the crossover of the differentiated A pulse by action of the AFC system, as taught in Patent 2,636,988, these particular positive sampling pulses occur at instants corresponding to the peak of the received loran A pulses. Accordingly, the output pulses of current from the gain synchronizer which result from the coincidence of the first positive sampling pulses and the A pulses vary according to the peak value of the A pulses.

In a similar manner, the second positive sampling pulses are brought into coincidence with the loran B pulses to produce output current pulses from the gain synchronizer which vary according to the peak value of the B pulses. Since the second positive sampling pulses are derived from the variably-delayed B pedestal pulses on lead 105, they are likewise variably-delayed pulses. In order to bring the second positive sampling pulses into coincidence with the received loran B pulses, the time position of these positive pulses is varied under the control of coarse delayed switch S-9 or the fine delay knob 96 of the B delay circuits 60 in order to match the received loran A and B pulses on the face of the cathode-ray tube 113 as in the normal operating procedure. When the A and B pulses are properly matched on the face of the cathode-ray tube 113, the second positive sampling pulses are coincident with the peak value of the received loran B pulses.

The first and second recurrent output pulses from the gain synchronizer 350 are coupled to the armature or movable contact 130 of relay 131. The winding of relay 131 is energized by the square-wave voltage from the relay driver 132. The armature 130 of relay 131 vibrates in synchronism with the applied square-wave voltage. The first output pulses of current varying according to the magnitude of the A pulses are supplied through armature 130 to a condenser 352, and the second output pulses of current varying according to the magnitude of the received B pulses are supplied through armature 130 to a condenser 353. The condenser 352 is charged to a potential varying according to the value of the first current pulses, and the condenser 353 is charged to a potential varying according to the value of the second current pulses.

The potential across condenser 352 is supplied over lead 357 to one input of the AGC circuits 356, and the potential across condenser 353 is supplied over lead 358 to a second input of the AGC circuits 356. The AGC circuits 356 are responsive to the potentials across condensers 352 and 353 to produce a direct output control voltage which varies according to the strength of the smaller of the direct potentials across these condensers, as more fully explained in my application S. N. 403,852, filed concurrently herewith. The automatic gain control voltage varying according to the smaller of the direct potentials across the condensers 352 and 353 is supplied to receiver 12 to control its gain.

*Automatic amplitude balancing circuits*

The automatic amplitude balance control circuits of the present invention are made possible by recognizing that an alternating potential exits at the armature or movable contact 130 of relay 131 which alternates between the charged potential on condenser 352 and the charged potential on 353. This alternating voltage is synchronized with the square-wave voltage which energizes the relay 131. When the potentials across condensers 352 and 353 are equal, representing the condition where the strength of the received loran A pulses is equal to the strength of the received loran B pulses, there is no alternating voltage present at armature 130 of relay 131. However, when the strength of the received A pulses is different from the strength of the received B pulses, a square-wave voltage is produced at the armature 130 whose phase is determined by the stronger of the received A or B pulses, and whose amplitude is determined by the difference in strength between the received A and B pulses. For example, when the received A pulses are stronger than the received B pulses, the potential at the armature 130 is more positive (less negative) during the time intervals when it is coupled across condenser 352 than when it is coupled across condenser 353. Conversely, when the received B pulses are stronger than the received A pulses, the potential at the armature is more positive (less negative) during the time intervals when it is coupled across condenser 353. This square-wave voltage alternating between the potential on condensers 352 and 353 is the automatic amplitude balance control voltage, and is supplied over lead 381 to the input of the AABC amplifier circuits 382.

The AABC amplifier circuits 382 include a triode cathode follower tube 383 receiving the square-wave AABC voltage through a simple low-pass filter comprising series resistor 384 and shunt capacitor 385. The low-pass filter removes any transient voltages present on the AABC voltage due to the switching of relay 131, and the filtered AABC voltage is coupled through condenser 386 to control-grid 387 of the tube 383. The cathode 388 is coupled through series connected resistors 389 and 390 to a fixed negative potential. Grid resistor 391 is coupled between control-grid 387 and the junction of resistors 389 and 390. The AABC voltage at cathode 388 is coupled through condenser 392 to the control-grid 393 of triode amplifier tube 394. The bias voltage for amplifier tube 394 is provided by the cathode resistor 395, the control-grid 393 being returned to ground through grid resistor 397. The amplifier tube 394 amplifies and inverts the phase of the applied AABC voltage, and the inverted output voltage appearing across the plate load resistor 398 is coupled through condenser 399 to the amplitude balance restorer 24 of receiver 12. The shunt condenser 400 from the anode 401 to ground sets the bandwidth of the amplifier tube 394 to a value suitable for amplifying the frequency components of the square-wave AABC voltage.

The amplified AABC voltage reduces the gain of receiver 12 during the reception of the loran A pulses when the A pulses are stronger in magnitude than the received B pulses, or it reduces the gain of the receiver during reception of the loran B pulses when the B pulses are stronger in magnitude than the received A pulses, in the same general manner as taught in my aforesaid Patent 2,651,033.

Control box 135 includes an automatic balance control on-off switch 136, a manual gain control 137, and a manual amplitude balance control 138, as explained in my aforesaid Patent 2,651,033. When the switch 136 is in the off position, the control box supplies manually adjustable control voltages across each condenser 352 and 353. The manual gain control 136 raises and lowers the applied control voltages together, and the manual amplitude balance control 138 raises the voltage supplied to one condenser while lowering the voltage supplied to the other condenser.

The loran receiver-indicator with the improved automatic amplitude balance control system of the present invention is adjusted by an operator to obtain useful navigational information in an identical manner as explained in my aforesaid Patent 2,651,033 under the section entitled "Operation of improved loran receiver-indicator."

The AABC system of the present invention is not limited solely to manually operated loran receiver-indicators but may be employed in automatic tracking loran receiver-indicators of the type described and claimed in pending application S. N. 267,347, now Patent 2,697,219, filed on January 21, 1952, in the name of Roger B. Williams, Jr., entitled "Automatic Time Difference Measuring Circuits" and assigned to the same assignee as the present invention.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A hyperbolic navigation receiver responsive to recurrent A pulses transmitted from a master station and to recurrent B pulses transmitted from a slave station, each of said recurrent B pulses arriving at the receiver at a time delayed from the arrival of each of corresponding recurrent A pulses, said receiver including an electrically controllable variable gain amplifier, relay means having a movable contact coupled to the output of said receiver, said relay means having first and second stationary contacts, first condenser means coupled to said first stationary contact, second condenser means coupled to said second stationary contact, means energizing said relay for coupling said movable contact to said first stationary contact during reception of the A pulses and for coupling said movable contact to said second stationary contact during the reception of the B pulses, said first condenser means being charged to a first direct potential according to the strength of said received A pulses, said second condenser means being charged to a second direct potential according to the strength of said received B pulses, the voltage on said movable contact alternating between said first direct potential and said second direct potential, and means coupling said alternating voltage to the gain controlling circuit of said hyperbolic navigation receiver for varying the gain of said receiver during the reception of one of said recurrent A or B pulses to maintain the received output A pulses substantially equal in magnitude to the received output B pulses.

2. An automatic amplitude balancing circuit comprising means producing a first pulse during a first time interval and a second pulse during a second time interval, said means including a controllable transmission circuit transmitting said first and second pulses, relay means having a movable contact coupled to the output of said transmission circuit, said relay means having first and second stationary contacts, first condenser means coupled to said first stationary contact, second condenser means coupled to said second stationary contact, means energizing said relay for switching said movable contact between said first and second stationary contacts, said relay means supplying said first pulse to said first condenser during said first time interval and supplying said second pulse to said second condenser during said second time interval, said first condenser being charged to a first direct potential according to the strength of said first pulse, said second condenser being charged to a second direct potential according to the strength of said second pulse, the voltage on said movable contact alternating between said first direct potential and said second direct potential, and means coupling said alternating voltage to said controllable transmission circuit for varying the transmission therethrough during one of said time intervals to maintain said output first pulse substantially equal in value to said output second pulse.

3. In a radio navigation receiver responsive to recurrent pulses including a first pulse received during a first time interval and to a second pulse received during a second time interval wherein the strength of the received first pulses may be different from the strength of the received second pulses, said receiver including an electrically controllable variable gain amplifier: the combination comprising means including a switching means and first and second condensers coupled across the output of said receiver, means energizing said switching means for coupling said first condenser across the output of said receiver during said first time interval and for coupling said second condenser across the output of said receiver during said second time interval, said first condenser being charged to a potential value according to the strength of the received first pulses, said second condenser being charged to a potential value according to the strength of said received second pulses, said combination producing an output voltage alternating between the potential across said first condenser during said first time interval and the potential across said second condenser during said second time interval, and means including a coupling between said switching means and said electrically controllable variable gain amplifier for introducing said alternating voltage into said receiver for controlling the gain of said receiver during one of said time intervals to maintain the output first pulses substantially equal in value to the output second pulses.

4. In combination, means for producing a recurrent wave consisting of a first pulse occurring during a first time interval and a second pulse occurring during a second time interval different from said first time interval, said producing means including means for varying the strength of said first and second pulses, means having a pair of terminals for receiving said recurrent wave, said means including a relay switching means having a movable contact coupled to one of said terminals and having first and second stationary contacts, first condenser means coupled between said first stationary contact and said other terminal, second condenser means coupled between said second stationary contact and said other terminal, means energizing said relay for coupling said first condenser across said pair of terminals during said first time interval and for coupling said second condenser across said pair of terminals during said second time interval, said first condenser being charged to a first direct potential value according to the strength of said first pulse, said second condenser being charged to a second direct potential value according to the strength of said second pulse, the voltage across said pair of terminals alternating between said first direct potential value across said first condenser during said first time interval and said second direct potential value across said second condenser during said second time interval, and means responsive to said alternating voltage and coupled to said producing means for varying the strength of one of said first or second recurrent pulses.

5. An automatic amplitude balancing circuit comprising in combination, means including first and second output terminals, asid means producing a first output pulse during a first time interval and producing a second output pulse during a second time interval across said output terminals, said means including a controllable transmission circuit transmitting said first and second output pulses, switching means having a movable contact coupled to said first output terminal and having first and second stationary contacts, first condenser means coupled between said first stationary contact and said second output terminal, second condenser means coupled between said second stationary contact and said second output terminal, means energizing said switching means for coupling said first condenser across said output terminals during said first time interval and for coupling said second condenser across said output terminals during said second time interval, said first condenser being charged to a first direct potential value according to the strength of said first pulse, said second condenser being charged to a second direct potential value according to the strength of said second pulse, the voltage across said output terminals alternating between said first direct potential value during said first time interval and said second direct potential value during said second time interval, and means coupling the alternating voltage across said output terminals to said controllable transmission circuit for varying the transmission therethrough during one of said time intervals to maintain said output first pulses substantially equal in strength to said output second pulses.

6. In a radio navigation receiver responsive to recurrent pulses including a first pulse received during a first time interval and to a second pulse received during a second time interval wherein the strength of the received first pulses may be different from the strength of the received second pulses, said receiver including an electrically controllable variable gain amplifier: means for producing an alternating voltage whose phase is determined by the strength of the received first pulse relative to the strength of the received second pulse, and whose amplitude is determined by the difference in strengths between the received first and second pulses, comprising in combination, first and second energy storage means, switching means coupled to said first and second energy storage means, means energizing said switching means for coupling said first energy storage means across the output of said navigation receiver during said first time interval and for coupling said second energy storage means across the output of said navigation receiver during said second time interval, said first energy storage means being responsive to said first pulse for producing a first direct potential varying according to the strength of said first pulse, said second energy storage means being responsive to said second pulse for producing a second direct potential varying according to the strength of said second pulse, the voltage across the output of said navigation receiver alternating between said first direct potential during said first time interval and said second directed potential during said second time interval, and means including a coupling between said switching means and said electrically controllable variable gain amplifier for introducing said alternating voltage into said receiver for controlling the gain of said receiver during one of said time intervals.

7. In combination, means for producing a recurrent wave consisting of a first pulse occurring during a first time interval and a second pulse occurring during a second time interval different from said first time interval, said producing means including means for varying the strength of said first and second pulses, means having a pair of terminals for receiving said recurrent wave, said means including a switching means and first and second energy storage means, means energizing said switching means for coupling said first energy storage means across said pair of terminals during said first time interval and for coupling said second energy storage means across said pair of terminals during said second time interval, said first energy storage means being responsive to said first pulse for producing a first direct potential varying according to the strength of said first pulse, said second energy storage means being responsive to said second pulse for producing a second direct potential varying according to the strength of said second recurrent pulse, said combination producing a voltage across said pair of terminals alternating between said first direct potential and said second direct potential, and means responsive to said alternating voltage and coupled to said producing means for varying the strength of one of said recurrent pulses.

References Cited in the file of this patent

UNITED STATES PATENTS 2,651,033   Frantz _____ Sept. 1, 1953